No. 634,718. Patented Oct. 10, 1899.
A. T. COLTON.
VEHICLE WHEEL.
(Application filed Jan. 27, 1898.)
(No Model.)
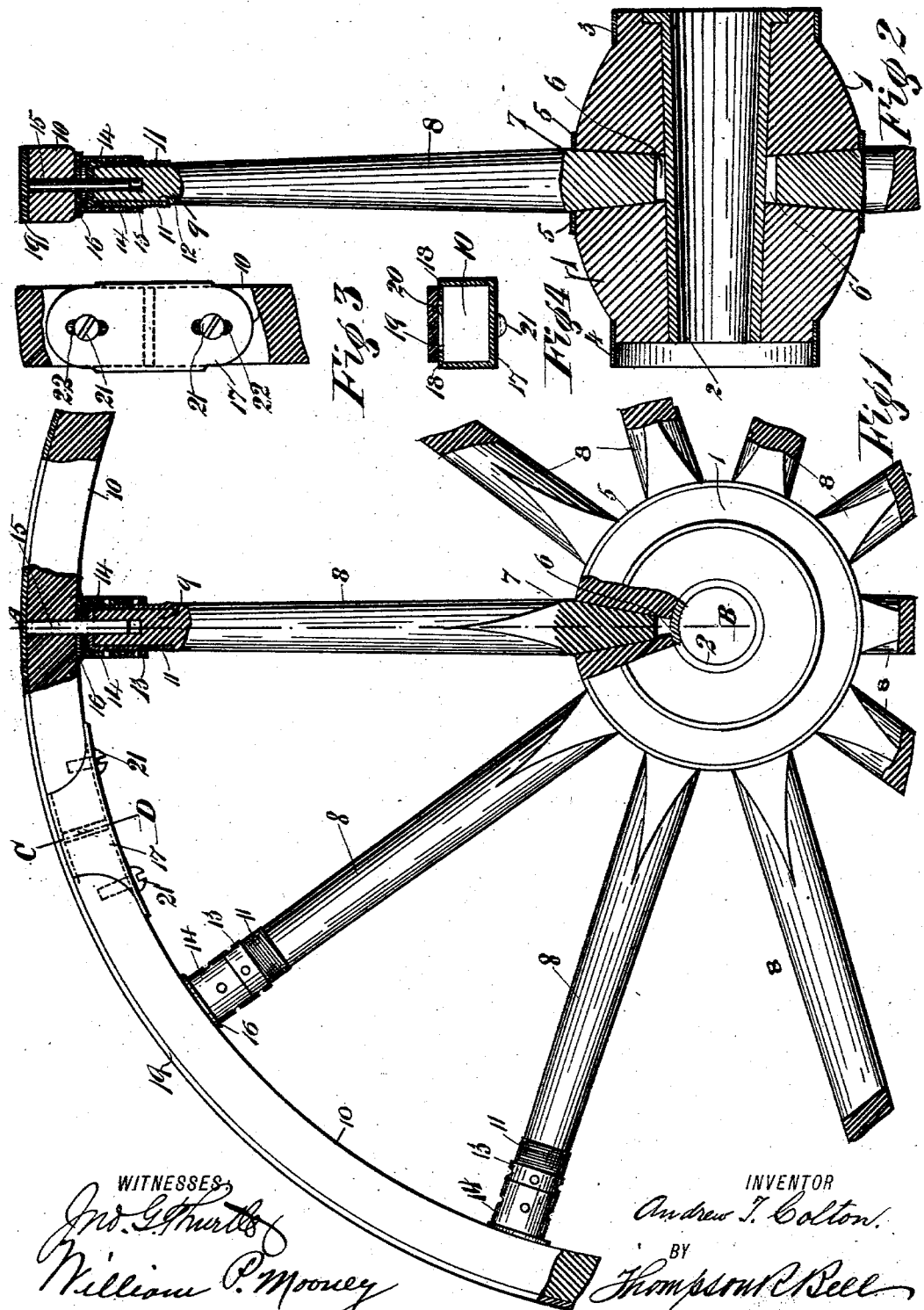
WITNESSES
INVENTOR
Andrew T. Colton.
BY
Thompson & Bell
ATTORNEY.

UNITED STATES PATENT OFFICE.

ANDREW T. COLTON, OF LAFAYETTE, INDIANA.

VEHICLE-WHEEL.

SPECIFICATION forming part of Letters Patent No. 634,718, dated October 10, 1899.

Application filed January 27, 1898. Serial No. 668,174. (No model.)

*To all whom it may concern:*

Be it known that I, ANDREW T. COLTON, a citizen of the United States, residing at Lafayette, in the county of Tippecanoe and State of Indiana, have invented new and useful Improvements in Vehicle-Wheels, of which the following is a specification.

My invention relates to new and useful improvements in the construction of vehicle-wheels, and is particularly applicable to those wheels in which the hubs, spokes, and rims are constructed of wood; and it consists in a means whereby the slack or looseness of the tires of such wheels may be taken up, as hereinafter more fully set forth.

The object of this my invention is to construct a vehicle-wheel of wood or other material susceptible to a variable degree of either expansion or contraction due to atmospheric conditions and influences in such a manner that the slackness of the rim of the wheel in its tire or any of the other parts constituting the wheel may be taken up and to accomplish this result without adding to the weight of or materially varying or departing from the current form of construction of wooden wagon or other vehicle wheels; and a further object is to provide means whereby any of the spokes of the wheel that may by any cause whatever be broken may be readily replaced by a new spoke without the aid of skilled labor or necessitating repair in the workshop. I obtain these objects by means of the form of construction of the vehicle-wheel illustrated in the accompanying drawings, in which similar numerals of reference designate like parts throughout the several views.

Figure 1 is a broken-off part sectional side elevational view of the wheel. Fig. 2 is a broken-off transverse sectional view of the same, taken through the line A B, see Fig. 1. Fig. 3 is a detail broken-off view of a portion of the rim and tire of the wheel, showing the joint-clamp thereof; and Fig. 4 is a transverse section of the same, taken through the line C D, see Figs. 1 and 3.

The hub 1 of the wheel is of wood and of the usual or any approved form of construction that is applicable to wooden vehicle-wheels and is provided with the usual or any suitable bearing or boxing 2, the reinforcing-ring 3, the guard-ring 4, and the center reinforcing-rings 5, which encircle the central portion of the hub, close up to the mortises 6 thereof, to prevent said hub from splitting at this part. The mortises 6 receive the feet 7 of the spokes 8. The spokes 8 do not project at their tenon ends 9 to be let into the rims or fellies 10 of the wheel, but are purposely made short to permit an amount of clearance between the tenon ends of said spokes and said fellies 10 to permit the ready removal of any of said spokes 8 without detaching the fellies 10 from the wheel, and the particular manner and means whereby these said tenon ends 9 of the spokes 8 are adjustably connected to the fellies 10 form the main feature of my invention and which I will now proceed to describe.

The tenon ends 9 of the spokes 8 are rounded and slightly reduced to firmly and securely fit into the ferrules or thimbles 11, and a key or feather way 12 is formed longitudinally in the interior periphery of each of said thimbles, into which is driven a suitable securing-key, by which said thimbles 11 are each securely held on the tenon ends 9 of said spokes 8 and are provided for the purpose of preventing said thimbles from turning on the ends of said spokes. The sleeve-nuts 14 are interiorly threaded to receive the threaded portions of the thimbles 11, whereon they are screwed. The tenon ends 9 of the spokes 8 are each bored longitudinally and centrally along their axes to loosely receive the ends of the dowel or centering pins 15, which pins also pass through and loosely fit in the bores formed in the ends of the thimbles 11, thereby forming a guide or centering pin for the spokes 8, by which means the latter are held in their proper positions relatively to the rim or felly 10 of the wheel. The rim or felly 10 is also bored radially to tightly and securely receive the outer ends of the said dowel or centering pins 15, and these holes register with the bores or holes formed in the tenon ends 9 of the spokes 8. Interposed between the sleeve-nut 14 and the rim or felly 10 are the bearing-washers 16, which are drilled centrally to receive the dowel-pins 15, and said washers are provided for the purpose of receiving the bearing pressure imposed by said sleeve-nuts 14 and distributing said pressure over a greater area of the yielding surface of the rim 10 to prevent indentations therein. Suitable locking or jam nuts 13 are also provided for the purpose of preventing the sleeve-nuts 14 from turning or working loose while the wheels are in use.

The segments of the rim or felly 10 do not abut to form close joints, but are preferably made slightly shorter to form open joints, which latter are covered or concealed by suitable joint-caps 17. The joint-caps 17 are bent over and fitted closely to the sides of the rim 10 and have their outer bends 18 bent to lap under the tire 19 to loosely fit in the recess 20, formed by reducing the ends at the joints of said felly or rim. The caps 17 are slotted centrally at or near the ends of their inner plate-flaps to receive the screws 21, which are firmly screwed into the said rim at the opposite sides of the joints thereof, but permit the free movement of said screws in their slots 22.

It will be readily understood that in the event of a spoke becoming loose the slackness or play may readily be taken up by means of the sleeve-nut 14, and in such cases where a spoke has been broken the same can be readily removed and replaced by a sound one.

Having thus fully described this my invention, what I claim as new and useful, and desire to cover by Letters Patent of the United States therefor, is—

In a vehicle-wheel, the combination with a felly, of a dowel-pin having one end seated in and secured to the felly and its other end projecting, a spoke having a socket in its end which loosely receives the projecting end of the dowel so that it can slide therein, a thimble or cap incasing the end of the spoke which is provided with exterior screw-threads, a sleeve-nut screwed on the thimble, a jam-nut on the thimble for clamping the sleeve-nut and a washer interposed between the sleeve-nut and the felly.

In testimony whereof I have hereunto set my hand in the presence of two subscribing witnesses.

ANDREW T. COLTON.

Witnesses:
 EVAN JONES,
 CHARLES W. BONE.